United States Patent

Shimizu et al.

[11] Patent Number: 5,704,641
[45] Date of Patent: Jan. 6, 1998

[54] POSITION STOPPER OF TILT STEERING COLUMN

[75] Inventors: Yoshiyuki Shimizu, Kosai; Yoshifumi Ishida, Hamamatsu, both of Japan

[73] Assignee: Fuji Kiko Co., Ltd., Tokyo, Japan

[21] Appl. No.: 565,241

[22] Filed: Nov. 30, 1995

[30] Foreign Application Priority Data

Nov. 30, 1994 [JP] Japan .................. 6-296399

[51] Int. Cl.⁶ .......................................... B62D 1/19
[52] U.S. Cl. ..................... 280/775; 280/777; 74/493; 188/371
[58] Field of Search .................. 280/775, 777, 280/779, 780; 74/493, 492; 188/371, 376, 377

[56] References Cited

U.S. PATENT DOCUMENTS

| | | | |
|---|---|---|---|
| 3,392,599 | 7/1968 | White | 280/777 |
| 4,307,626 | 12/1981 | Sanada et al. | 280/775 |
| 4,330,139 | 5/1982 | Katayama | 280/777 |
| 4,733,575 | 3/1988 | Nakamura | 280/775 |
| 4,901,592 | 2/1990 | Ito et al. | 280/777 |
| 4,915,412 | 4/1990 | Yuzuhira et al. | 280/775 |
| 5,088,768 | 2/1992 | Maruyama et al. | 280/777 |

*Primary Examiner*—Richard M. Camby
*Assistant Examiner*—Peter C. English
*Attorney, Agent, or Firm*—Foley & Lardner

[57] ABSTRACT

A position stopper for an automotive tilt steering column includes an upper clamp connected to the vehicle above the steering column. The upper clamp includes two spaced walls between which a part of the steering column extends. A first structure is secured to a lower portion of the part of the steering column. The walls are formed with vertically extending slots. A bolt passes through the first structure with both ends projected through the respective slots. One of the projected ends of the bolt is externally threaded. An operation lever has a nut secured to the externally threaded end of the bolt. The other projected end of the bolt has a bolt stopper which contacts the wall to suppress rotation of the bolt about its axis. A second structure is secured to the jacket tube. The second structure has at least a portion resiliently interposed between each of the walls of the upper clamp and the jacket tube to suppress play in the steering column relative to the upper clamp.

17 Claims, 6 Drawing Sheets

POSITION STOPPER OF TILT STEERING COLUMN

BACKGROUND OF THE INVENTION

1. Field of the Invention

The present invention relates in general to tilt steering columns of a motor vehicle, and more particularly to position stoppers of such tilt steering columns.

2. Description of the Prior Art

For providing a driver with an easy driving posture, tilt steering columns have been widely employed particularly in the field of wheeled motor vehicles. As is known, the tilt steering column is a steering column which can tilt upward or downward to a desired angular position which provides a driver with an easy driving posture.

For locking the tilt steering column at such desired angular position, a position stopper is used. Some of conventional position stoppers are of a type which comprises an upper clamp which is secured to a vehicle body, a bracket which is secured to the tilt steering column and movably engaged with the upper clamp, and a fastener which fastens the bracket to the upper clamp at a desired angular position of the steering column.

However, due to their inherent constructions, the fasteners employed in the above-mentioned conventional position stoppers tend to have the following drawbacks.

That is, when the weight of the steering column increases due to, for example, provision of an air-bag unit in the steering wheel, the fastener fails to produce a fastening force sufficient for tightly fastening the bracket to the upper clamp. In this case, undesired play of the steering column tends to occur causing production of uncomfortable noise. This undesired phenomenon is marked when the vehicle is under idling condition or high speed cruising. If the fastening force is insufficient, a great shock produced when the air-bag is expanded upon a vehicle collision would dislocate the steering column. Of course, this column dislocation severely affects the performance of the air-bag.

SUMMARY OF THE INVENTION

It is therefore an object of the present invention to provide a position stopper of an automotive tilt steering column, which is free of the above-mentioned drawbacks.

According to the present invention, there is provided a position stopper for a tilt steering column installed in a vehicle. The position stopper comprises an upper clamp connected to the vehicle above the tilt steering column, the upper clamp including two spaced wall members between which a given part of the steering column is put; a first structure secured to a lower portion of the given part of the steering column; means for defining in the wall members vertically extending slots which face each other; a bolt passing through the first structure with both ends projected to the outside through the respective slots, one of the projected ends of the bolt being externally threaded; an operation lever having a nut secured thereto, the nut being meshed with the externally threaded end of the bolt; means for connecting the other projected end of the bolt to the wall member to suppress rotation of the bolt about its axis; and a second structure secured to the jacket tube, the second structure having at least a portion resiliently interposed between each of the wall members of the upper clamp and the jacket tube thereby to suppress play of the steering column relative to the upper clamp.

BRIEF DESCRIPTION OF THE DRAWINGS

Other objects and advantages of the present invention will become apparent from the following description when taken in conjunction with the accompanying drawings, in which.

DETAILED DESCRIPTION OF THE EMBODIMENTS

Figure 1:
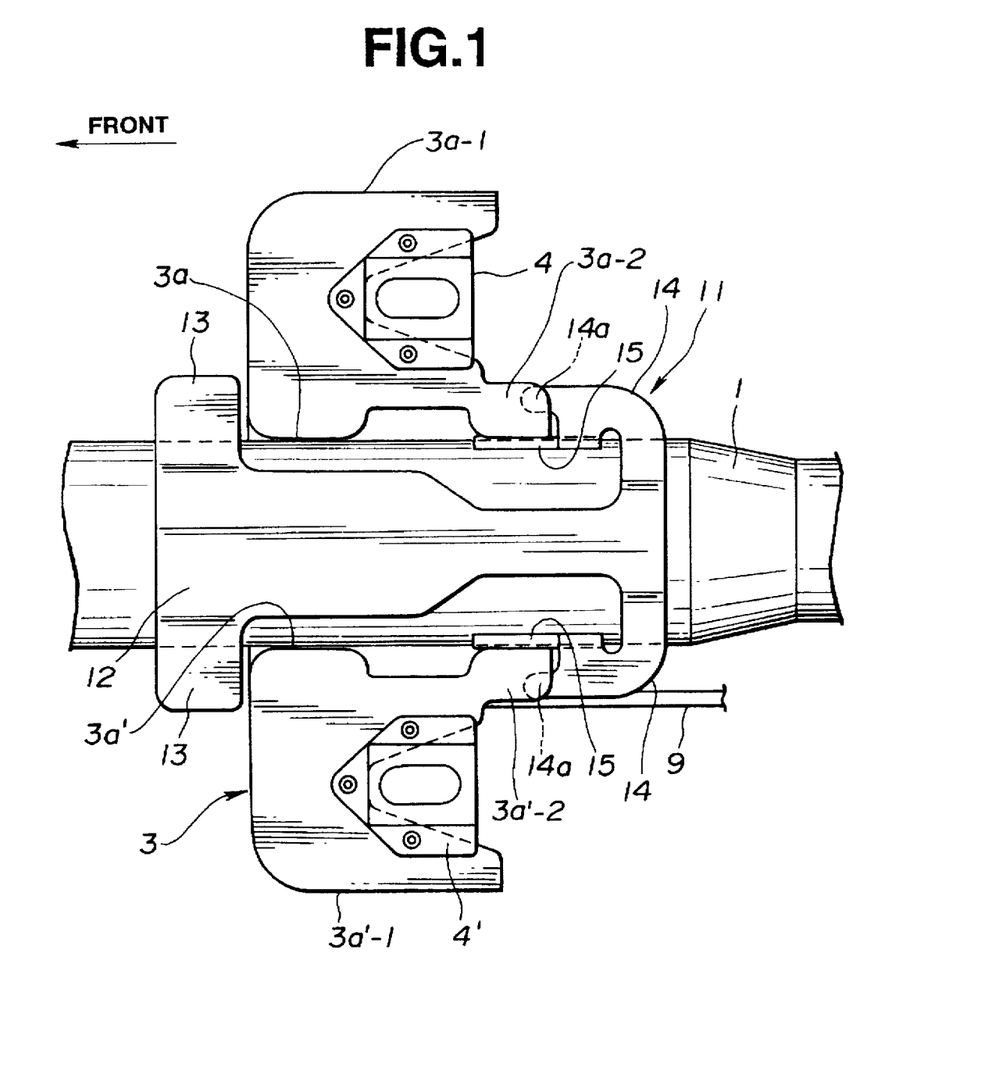
FIG. 1 is a plan view of a position stopper of a tilt steering column, which is a first embodiment of the present invention.
Figure 2:
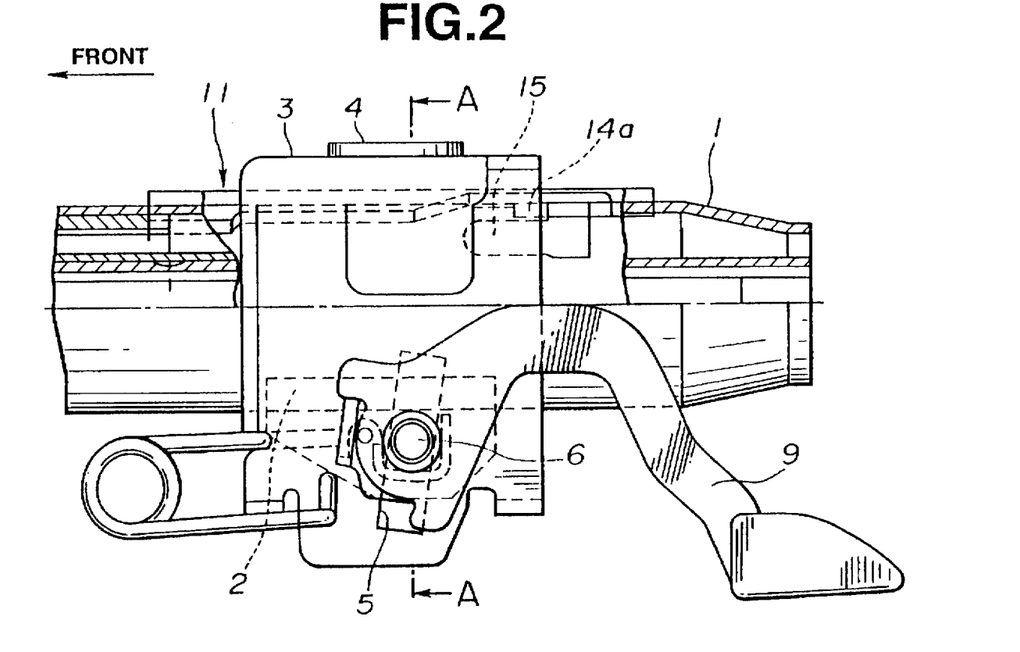
FIG. 2 is a side view of the position stopper of the first embodiment.
Figure 3:
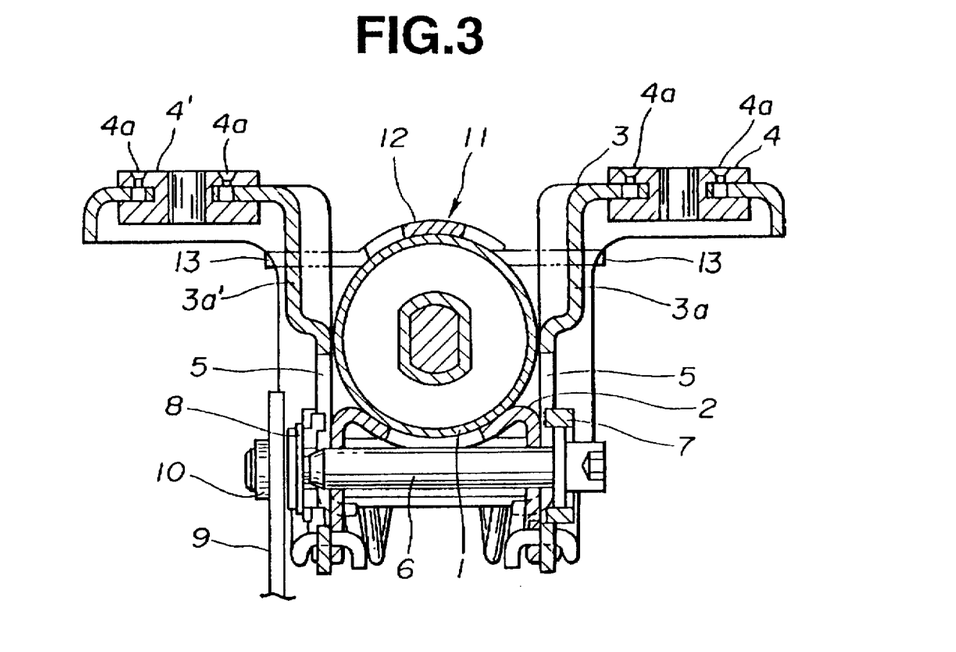
FIG. 3 is a sectional view taken along the line A—A of FIG. 2.

Referring to FIGS. 1 to 3, there is shown a position stopper of a tilt steering column, which is a first embodiment of the present invention.

In the drawings, particularly FIG. 3, denoted by numeral 1 is a jacket tube of a steering column. Although not shown in the drawings, the steering column has at its front end a known tilting device about which the steering column can tilt. A distance bracket 2 having a generally M-shaped cross section is secured to a lower portion of the jacket tube 1. Putting therebetween both the distance bracket 2 and the jacket tube 1 are two identical vertical wall members 3a and 3a' which constitute an upper clamp 3. As shown, each wall member 3a or 3a' has an outwardly extending upper flange 3a-1 or 3a'-1 which is connected to a vehicle body (not shown) through a slide block 4 or 4'. As is seen from FIG. 1, each upper flange 3a-1 or 3a'-1 is formed, near the jacket tube 1, with a rear projection 3a-2 or 3a'-2 for the purpose which will be clarified hereinafter.

As is understood from FIG. 1, the slide block 4 or 4' is secured to the vehicle body by bolts.

As is seen from FIG. 3, the slide block 4 or 4' is formed around a generally front half edge portion thereof with a slit into which a recessed rear edge of the upper flange portion of the wall member 3a or 3a' is thrust. Shear pins 4a of plastic are used for connecting the wall member 3a or 3a' with the slide block 4 or 4'. That is, if a big shock is applied due to a vehicle collision or the like, the pins 4a are broken.

As is seen from FIGS. 2 and 3, the wall members 3a and 3a' of the upper clamp 3 are respectively formed with vertically extending slots 5 and 5 which face each other. A fastening bolt 6 laterally passing through the distance bracket 2 has both ends projected to the outside from the respective slots 5 and 5. As is seen from FIG. 3, one projected end of the fastening bolt 6 is equipped with a bolt stopper 7 which contacts to an outer surface of the wall member 3a in a manner to suppress turning of the bolt 6. The other projected end of the bolt 6 is externally threaded. A nut 10 secured to a front part of an operation lever 9 is meshed with the threaded end of the bolt 6. A spring washer 8 is disposed about the bolt 6 and compressed between the operation lever and the wall member 3a'.

Thus, when the operation lever 9 is pivoted downward, the two wall members 3a and 3a' of the upper clamp 3 are inclined toward each other thereby to tightly fasten the distance bracket 2 therebetween. With this, the steering column is tightly fastened to the upper clamp 3 at a selected angular position. While, when the operation lever 9 is pivoted upward, the two wall members 3a and 3a' are inclined away from each other thereby releasing the distance bracket 2. Under this condition, the steering column can tilt freely with the fastening bolt 6 sliding in the slots 5 of the wall members 3a and 3a'.

As is understood from FIGS. 1, 2 and 3, a stopper bracket 11 is secured to an upper portion of the jacket tube 1 at a position diametrically opposite to a position where the distance bracket 2 is arranged. As is seen from FIG. 1, the stopper bracket 11 is a generally H-shaped steel plate.

As is seen from FIGS. 1 and 3, the stopper bracket 11 comprises a major curved portion 12 which is intimately mounted and welded to the upper portion of the jacket tube 1 and is put between the wall members 3a and 3a' of the upper clamp 3, a front T-shaped portion which has wing portions 13 and 13 positioned just in front of the wall members 3a and 3a' of the upper clamp 3 and a rear T-shaped portion which has wings 14 and 14. Each wing 14 of the rear T-shaped portion has both a hook portion 14a which is led under the rear projection 3a-2 or 3a'-2 of the flange 3a-1 or 3a'-1 of the wall member 3a or 3a' and a vertical wall portion 15 which extends forward from a base part of the hook portion 14a and is resiliently led into a space defined between the jacket tube 1 and the corresponding wall member 3a or 3a'.

More specifically, each vertical wall portion 15 is constructed to resiliently abut against both the jacket tube 1 and the wall member 3a or 3a' of the upper clamp 3.

With the above-stated construction of the first embodiment, the following advantages are obtained.

Due to provision of the vertical wall portions 15 and 15 of the stopper bracket 11 which resiliently abut against the jacket tube 1 and the wall members 3a and 3a' of the upper clamp 3, undesired lateral play of the jacket tube 1 (viz., steering column) is suppressed and thus uncomfortable noise caused by such play is not produced or at least minimized.

When, due to a vehicle collision or the like, a great force is applied to the jacket tube 1 of the steering column in a direction to push the same toward the passenger cabin, undesired rushing of the steering column into the cabin is suppressed due to provision of the front T-shaped portion of the stopper bracket 11. That is, in such severe case, the wing portions 13 and 13 of the front T-shaped portion are brought into abutment with the front edges of the wall members 3a and 3a' of the upper clamp 3.

Even when, due to vehicle collision or the like, a great force is applied to the jacket tube 1 (viz., steering column), by for example a driver, in a direction to raise the same, the rear projections 3a-2 and 3a'-2 of the wall members 3a and 3a' suppress such raising by abutting against the hook portions 14a and 14a of the stopper bracket 11.

Referring to FIGS. 4, 5, 6 and 7, there is shown a position stopper of a tilt steering column, which is a second embodiment of the present invention.

Figure 4:
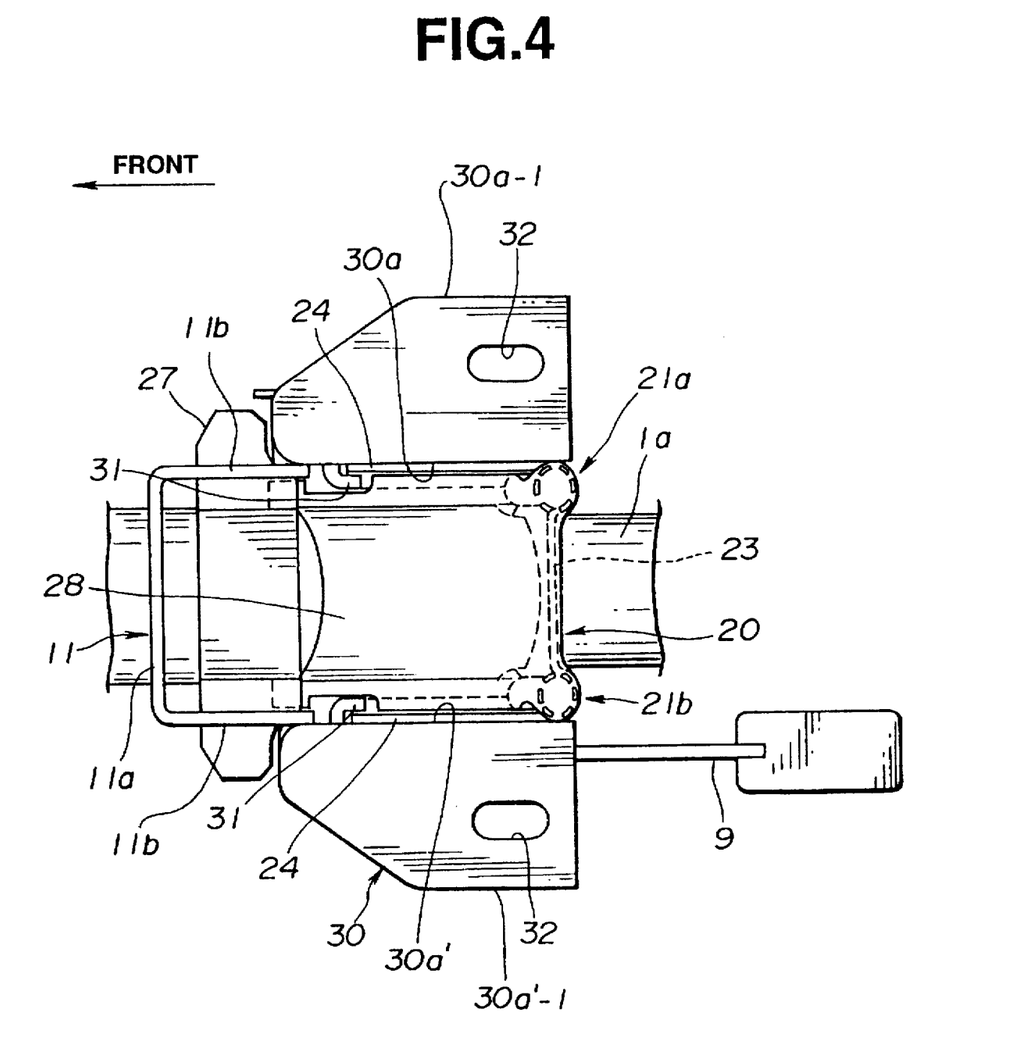
FIG. 4 is a view similar to FIG. 1, but showing a second embodiment of the present invention.

In the drawings, particularly FIG. 4, denoted by numeral 1a is a jacket tube of a steering column. Similar to the first embodiment, the steering column has at its front end a known tilting device about which the steering column can tilt.

A shock absorbing unit 20 having an after-mentioned structure is incorporated with the jacket tube 1a and an upper clamp 30. The shock absorbing unit 20 extends between two identical vertical wall members 30a and 30a' which constitute the upper clamp 30. As is seen from FIG. 6, each wall member 30a or 30a' has an outwardly extending upper flange 30a-1 or 30a'-1 which is secured to a vehicle body (not shown) through a bolt (not shown). For this securing, each upper flange 30a-1 or 30a'-1 is formed with an opening 32 through which the bolt passes. As is seen in FIG. 4, for the purpose which will become apparent hereinafter, each upper flange 30a-1 or 30a'-1 is integrally formed at a front inner edge portion with a rigid L-shaped stopper lug 31.

Figure 5:
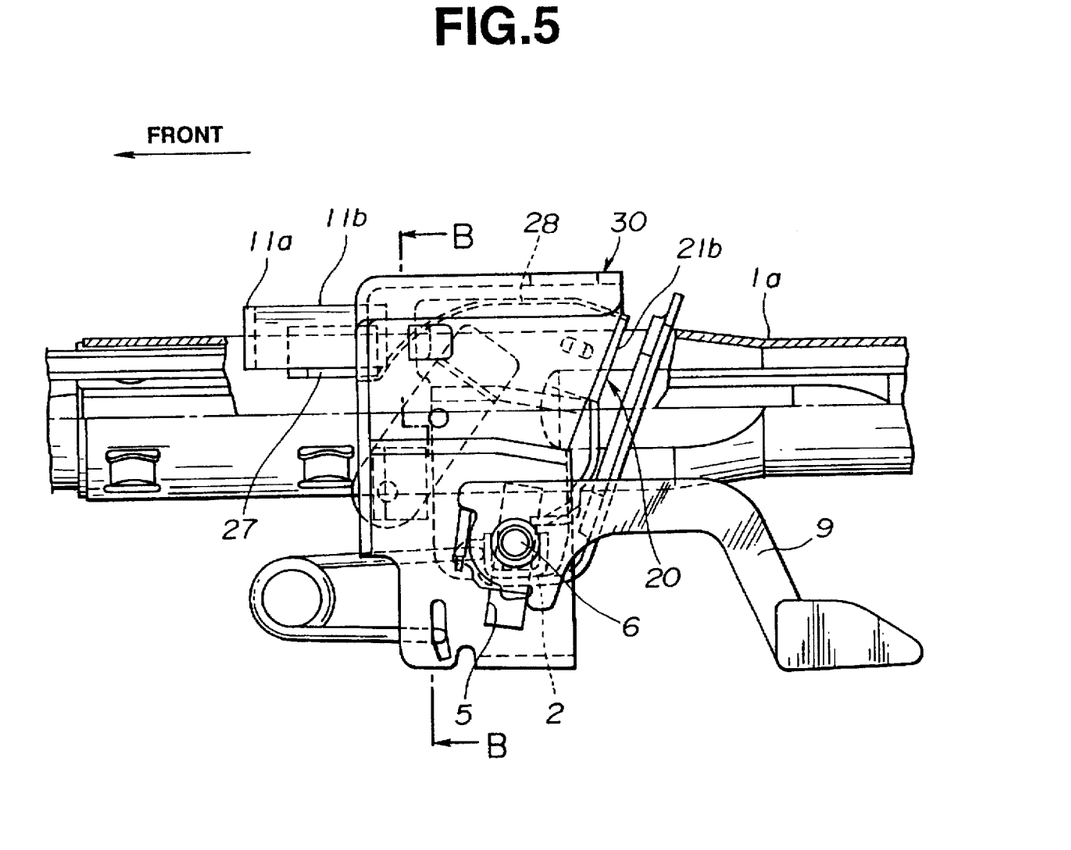
FIG. 5 is a view similar to FIG. 2, but showing the second embodiment of the present invention.

As is seen from FIG. 5, similar to the first embodiment, the wall members 30a and 30a' of the upper clamp 30 are respectively formed with vertically extending slots 5 and 5 which face each other.

Figure 7:
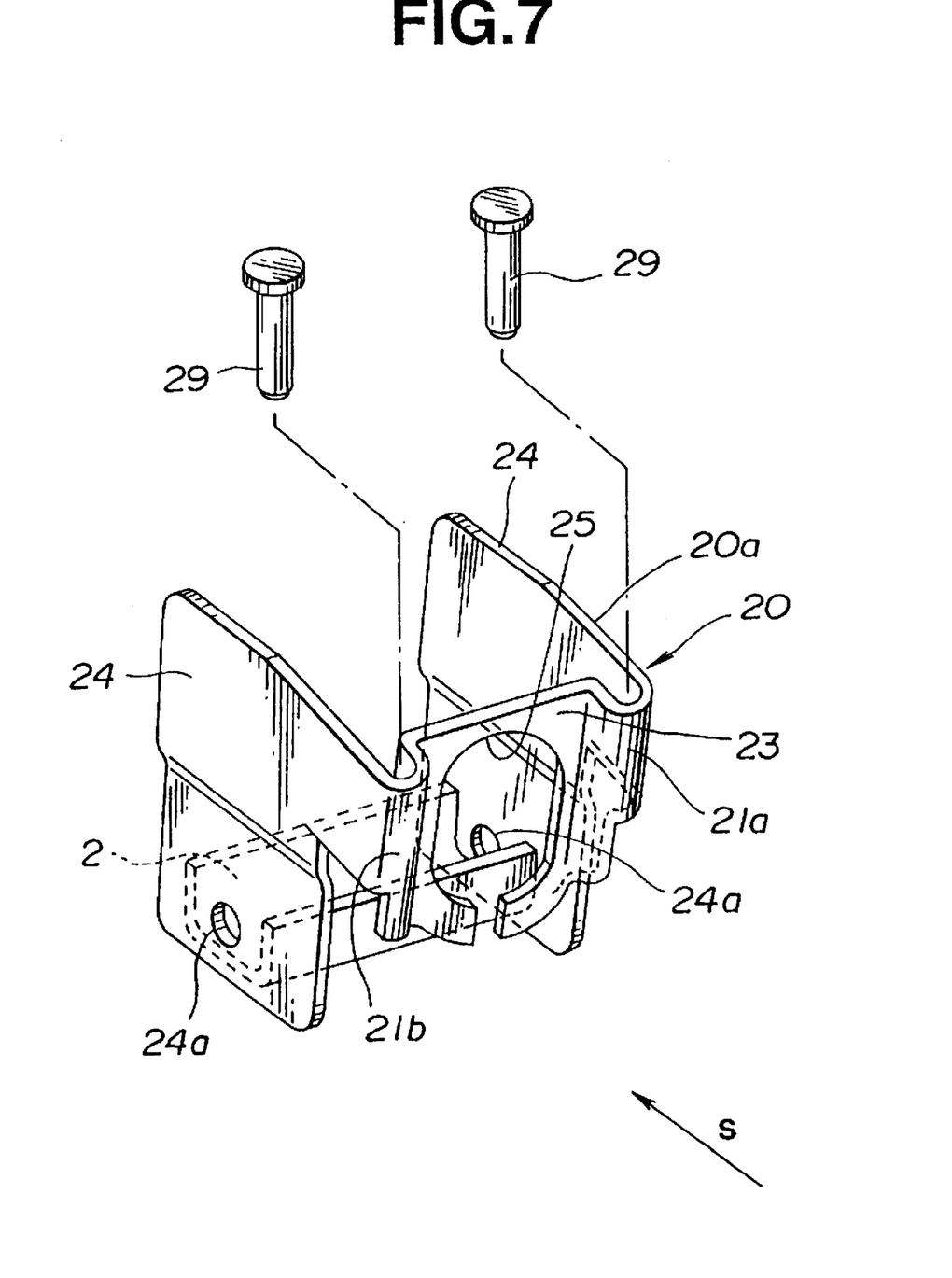
FIG. 7 is a perspective view of a shock absorbing unit employed in the position stopper of the second embodiment.

The shock absorbing unit 20 extending between the two wall members 30a and 30a' is clearly shown in FIG. 7. The shock absorbing unit 20 comprises a generally M-shaped shock absorbing member 20a and a distance bracket 2 which are welded to each other to constitute a single unit.

As shown in the drawing, the M-shaped shock absorbing member 20a comprises two side walls 24 and 24 which are spaced from each other and a rear wall 23 which extends between rear ends of the side walls 24 and 24. The side walls 24 and 24 are respectively formed with circular openings 24a and 24a which are coaxially aligned. As shown, each of the side walls 24 and 24 has a rear lower portion cut off. The rear wall 23 is formed with a round recess 25 through which the jacket tube 1a is to pass. Therefore, the side walls 24 of the shock absorbing unit 20 extend between the jacket tube 1a and the wall members 30a and 30a' of the upper clamp 30 to suppress play in the steering column. The rear wall 23 is formed at lateral sides thereof with rearwardly projected semi-cylindrical portions 21a and 21b. Within the semi-cylindrical portions 21a and 21b, there are respectively inserted roller pins 29 and 29.

Thus, when a big shock is applied to the M-shaped shock absorbing member 20a in the direction of the arrow "S" (see FIG. 7), the semi-cylindrical portions 21a and 21b are easily deformed while absorbing the shock. When the shock is too great, the smaller portions 21a and 21b are ripped.

As is shown in FIG. 7, the distance bracket 2 has a generally U-shaped cross section. The distance bracket 2 extends between the two side walls 24 and 24 of the shock absorbing member 20a with its open side facing upward. Opposed open ends of the distance bracket 2 are welded to the side walls 24 and 24 in such a manner as to mate with the openings 24a of the side walls 24 and 24 respectively.

As is understood from FIG. 4, the shock absorbing unit 20 is disposed between the wall members 30a and 30a' of the upper clamp 30 with the rear wall 23 facing rearward. Under this condition, upper front edges of the side walls 24 of the shock absorbing member 20a are engaged with the L-shaped stopper lugs 31 of the upper clamp 30. That is, the L-shaped stopper lugs 31 hold the upper front edges in a manner to suppress forward movement of the shock absorbing member 20a relative to the upper clamp 30. The jacket tube 1a of the steering column passes through the round recess 25 of the M-shaped shock absorbing member 20a while being put on the distance bracket 2 (see FIG. 7), and the side walls 24 of the shock absorbing member 20a contact with the wall members 30a and 30a' of the upper clamp 30 in such a manner that, as is understood from FIG. 5, the circular openings 24a and 24a of the shock absorbing member 20a mate with the slots 5 and 5 of the upper clamp 30. The jacket tube 1a is welded to the peripheral portion of the round recess 25 of the shock absorbing member 20a. Therefore, the side walls 24 of the shock absorbing unit 20 extend between the jacket tube 1a and the wall members 30a and 30a' of the upper clamp 30 to suppress play in the steering column.

As is seen from FIG. 5, a fastening bolt 6 passes through the slot 5, the circular opening 24a, the circular opening 24a and the slot 5 and has both ends projected to the outside from the respective slots 5 and 5. Similar to the first embodiment, a bolt stopper (not shown) is connected to one projected end of the fastening bolt 6 and contacts the wall member 30a of the upper clamp 30, and an operation lever 9 and a washer member (not shown) are incorporated with the other projected end of the fastening bolt 6 which is externally threaded.

Figure 6:
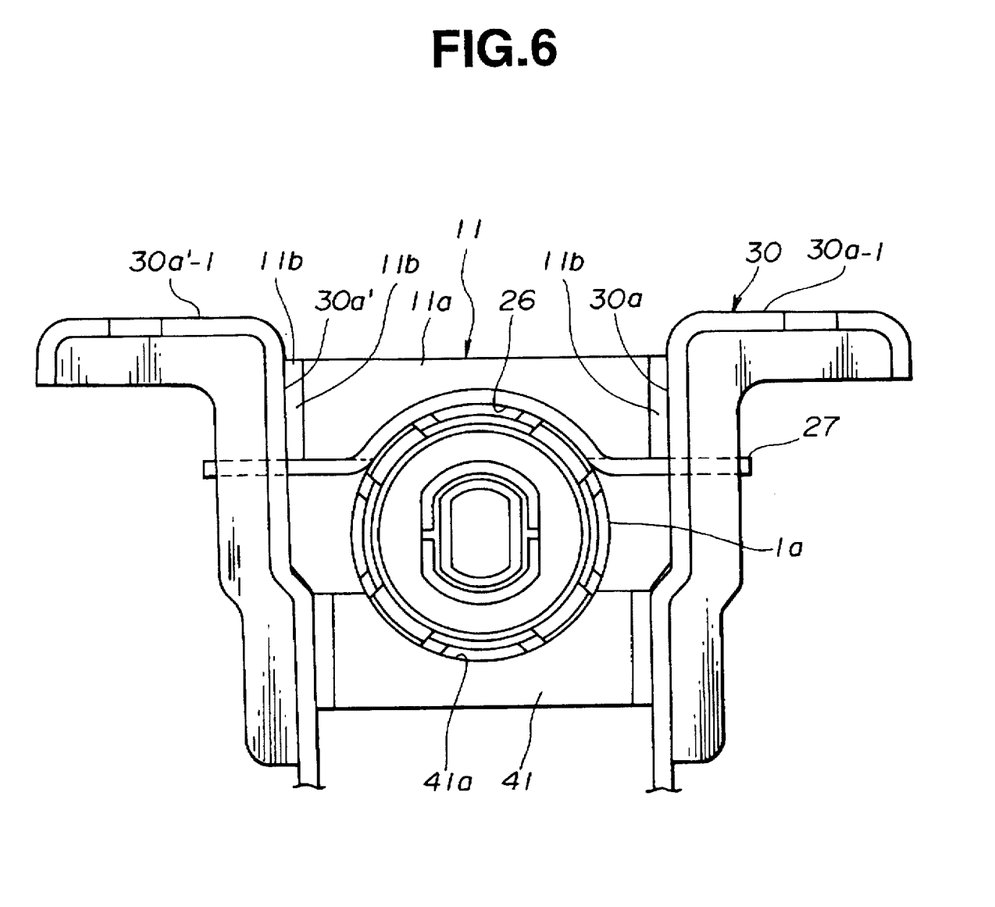
FIG. 6 is a sectional view taken along the line B—B of FIG. 5.

As is shown in FIGS. 4, 5 and 6, a holder plate 27 is put on the jacket tube 1a in front of the shock absorbing unit 20. As is seen from FIG. 6, the holder plate 27 has a concave middle portion 26 which is intimately put on and welded to the jacket tube 1a, and as is seen from FIG. 4, the lateral ends of the holder plate 27 20 extend outward beyond the wall members 30a and 30a' of the upper clamp 30.

Designated by numeral 11 in FIGS. 4 and 5 is a stopper bracket 11. The stopper bracket 11 employed in this embodiment is an angular arch member which comprises a front plate member 11a put on and welded to an upper portion of the jacket tube 1a and two side plate members 11b and 11b which extend rearward from lateral ends of the front plate member 11a to front ends of the side walls 24 of the M-shaped shock absorbing member 20a.

The front plate member 11a is formed with an arcuate recess to intimately receive therein the upper portion of the jacket tube 1a. The side plate members 11b and 11b of the stopper bracket 11 are put on the holder plate 27. The side plate members 11b and 11b are resiliently pressed against the wall members 30a and 30a' of the upper clamp 30.

Designated by numeral 28 is a plastic cover which covers an open upper portion of the shock absorbing unit 20.

If desired, as is shown in FIG. 6, another stopper bracket 41 may be employed, which extends between the wall members 30a and 30a' of the upper clamp 30 at a position below the jacket tube 1a. The stopper bracket 41 is formed with an arcuate slot 41a for intimately receiving therein a lower portion of the jacket tube 1a. The stopper bracket 41 is welded to the jacket tube 1a.

With the above-stated construction of the second embodiment, the following advantages are obtained.

Due to provision of the L-shaped stopper lugs 31 and 31 of the upper clamp 30 with which the upper front edges of the shock absorbing unit 20 are engaged, the connection between the upper clamp 30 and the shock absorbing unit 20 is assured, which provides the position stopper with a robust structure.

Since the side plate members 11b and 11b of the stopper bracket 11 are resiliently pressed against the wall members 30a and 30a' of the upper clamp 30, lateral play of the jacket tube 1a (viz., steering column) is suppressed or at least minimized.

Due to provision of the shock absorbing unit 20 having the above-mentioned construction, a big shock applied to the steering column by a driver upon a vehicle collision or the like is effectively absorbed.

Even when, due to a vehicle collision or the like, a great force is applied to the jacket tube 1a (viz., steering column) by for example a driver in a direction to raise the same, the interlocked engagement between the jacket tube 1a, the shock absorbing unit 20 and the upper clamp 30 suppress such undesired raising.

What is claimed is:

1. A supporting mechanism for a tilt steering column installed in a vehicle, comprising:

an upper clamp connecting the steering column to the vehicle, the upper clamp including first and second spaced walls, between which a part of the steering column extends;

first and second slots in the first and second walls, respectively;

a distance bracket interposed between the first and second walls, below the part of the steering column;

a bolt passing through the distance bracket and having a first end and a second end, the first and second ends projecting through the first and second slots, respectively;

an H-shaped stopper bracket having a front wing portion and a rear wing portion, the rear wing portion including first and second vertical wall portions and first and second hook portions;

wherein the H-shaped stopper bracket is secured to the part of the steering column, the first and second vertical wall portions are resiliently pressed against the first and second walls, respectively, and the first and second hook portions abut the first and second walls, respectively.

2. A supporting mechanism as claimed in claim 1, wherein the front wing portion of the stopper bracket is positioned in front of the walls of the upper clamp, and the rear wing portion of the stopper bracket is positioned near a rear part of the walls of the upper clamp.

3. A supporting mechanism as claimed in claim 1, further comprising an operation lever having a nut;

wherein one of the first and second ends of the bolt is externally threaded, the nut being engageable with the externally threaded end of the bolt.

4. A supporting mechanism for a tilt steering column installed in a vehicle, comprising:

an upper clamp connecting the steering column to the vehicle, the upper clamp including first and second spaced walls, between which a part of the steering column extends;

first and second slots in the first and second walls, respectively;

a distance bracket interposed between the first and second walls, below the part of the steering column;

a bolt passing through the distance bracket and having a first end and a second end, the first and second ends projecting through the first and second slots, respectively;

a U-shaped stopper bracket secured to the part of the steering column and including first and second vertical wall portions which are resiliently pressed against front portions of the first and second walls, respectively.

5. A supporting mechanism as claimed in claim 4, further comprising an operation lever having a nut;

wherein one of the first and second ends of the bolt is externally threaded, the nut being engageable with the externally threaded end of the bolt.

6. A supporting mechanism for a tilt steering column installed in a vehicle, comprising:

an upper clamp connecting the steering column to the vehicle, the upper clamp including first and second spaced walls, between which a part of the steering column extends;

a first structure secured to a lower portion of the part of the steering column;

first and second slots in the first and second walls, respectively;

a bolt passing through the first structure and having a longitudinal axis, a first end and a second end, the first and second ends projecting through the first and second slots, respectively, and one of the first and second ends being externally threaded;

an operation lever having a nut secured thereto, the nut being engageable with the externally threaded end of the bolt;

a bolt stopper for suppressing rotation of the bolt about its longitudinal axis relative to the upper clamp; and a stopper bracket including a major curved portion mounted to the part of the steering column, a front T-shaped portion having first and second front wing portions adjacent the first and second walls, and a rear T-shaped portion having first and second rear wing portions resiliently interlocked with the first and second walls, respectively.

7. A supporting mechanism as claimed in claim 6, wherein the first rear wing portion includes a first hook extending under a rear projection of the first wall of the upper clamp, and a first vertical wall extending from the first hook between the steering column and the first wall of the upper clamp; and wherein the second rear wing portion includes a second hook extending under a rear projection of the second wall of the upper clamp, and a second vertical wall extending from the second hook between the steering column and the second wall of the upper clamp.

8. A supporting mechanism as claimed in claim 6, further comprising a washer disposed about the bolt between the operation lever and one of the first and second walls of the upper clamp.

9. A supporting mechanism as claimed in claim 6, wherein the first and second walls further comprise first and second flanges, respectively; and wherein first and second slide blocks are secured to the vehicle and are mounted to the first and second flanges, respectively, by shear pins.

10. A supporting mechanism as claimed in claim 9, wherein the shear pins are plastic.

11. A supporting mechanism for a tilt steering column installed in a vehicle, comprising:

an upper clamp connecting the steering column to the vehicle, the upper clamp including first and second walls between which a part of the steering column extends;

a first structure secured to a lower portion of the part of the steering column;

first and second slots in the first and second walls, respectively;

a bolt passing through the first structure and having a longitudinal axis, a first end and a second end, the first and second ends projecting through the first and second slots, respectively, and one of the first and second ends being externally threaded;

an operation lever having a nut secured thereto, the nut being engageable with the externally threaded end of the bolt;

a bolt stopper for suppressing rotation of the bolt about its longitudinal axis relative to the upper clamp;

a shock absorber mounted to the steering column and having first and second side walls between which the first structure extends, the first and second side walls being formed with respective openings through which the bolt passes, and a rear wall which extends between the first and second side walls, the rear wall being formed with a recess through which the steering column passes, a peripheral portion of the recess being secured to the steering column; and a first stopper bracket including a front plate which is mounted to the steering column and first and second side plates which extend from the front plate to ends of the first and second side walls of the shock absorber.

12. A supporting mechanism as claimed in claim 11, wherein the shock absorber is easily deformed when a shock is applied through the steering column.

13. A supporting mechanism as claimed in claim 11, wherein the rear wall of the shock absorber is formed at lateral sides thereof with rearwardly projecting semi-cylindrical portions having roller pins installed therein.

14. A supporting mechanism as claimed in claim 11, wherein the front plate of the first stopper bracket includes an arcuate recess to receive therein a portion of the steering column.

15. A supporting mechanism as claimed in claim 14, further comprising a holder plate having a concave middle portion mounted to the steering column adjacent the shock absorber, and lateral ends extending beyond the first and second walls of the upper clamp;

wherein the first and second side plates of the first stopper bracket are supported by the holder plate.

16. A supporting mechanism as claimed in claim 11, wherein the first and second walls of the upper clamp include first and second rigid L-shaped stopper lugs, respectively, with which upper edges of the first and second side walls of the shock absorber are engaged, respectively.

17. A supporting mechanism as claimed in claim 11, further comprising a second stopper bracket extending between the first and second walls of the upper clamp, and mounted to the steering column at a position opposite the first stopper bracket.

* * * * *